June 27, 1950  B. O. STROTHER  2,512,979
STEERING SYSTEM
Filed July 31, 1947  2 Sheets-Sheet 1
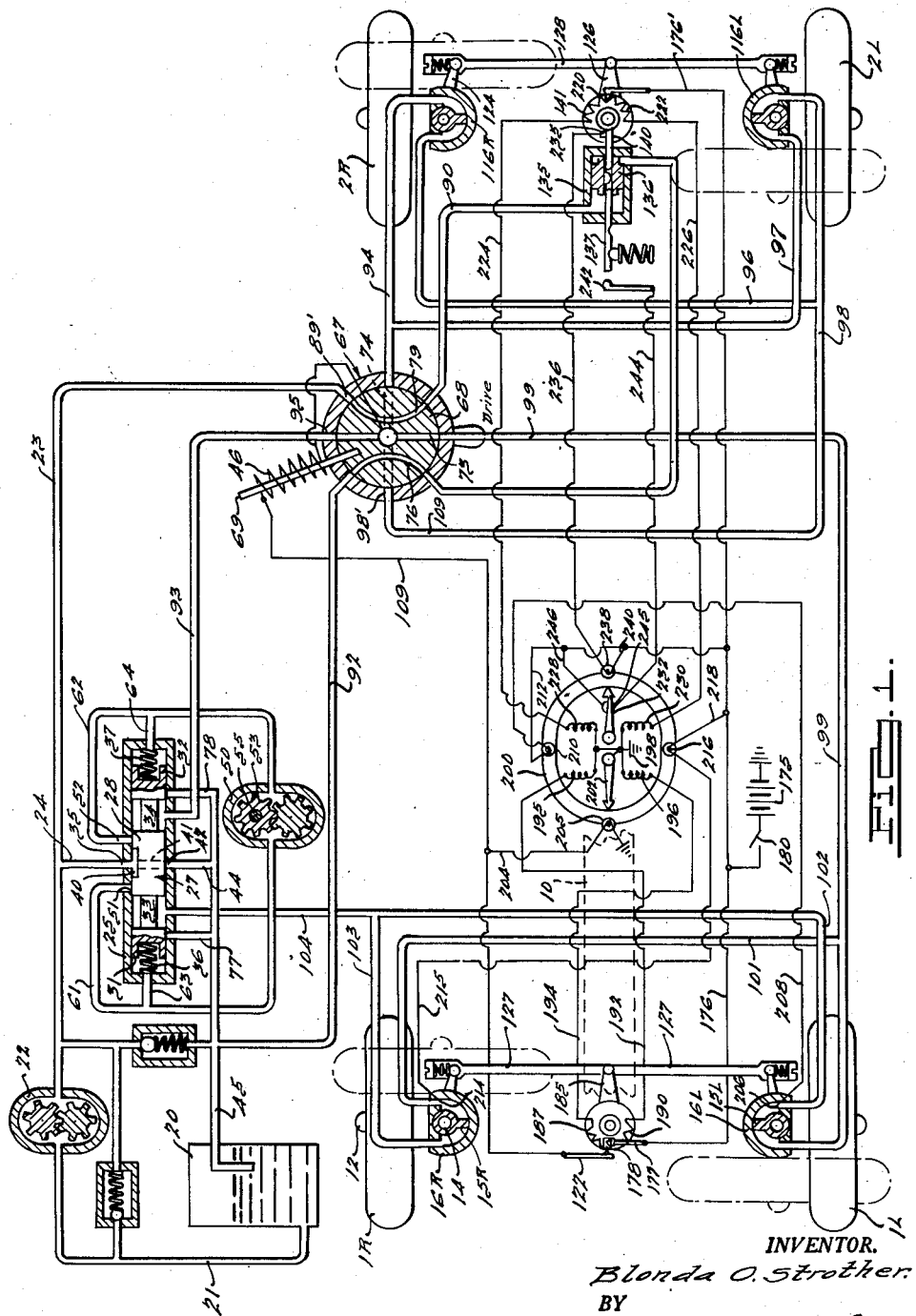
INVENTOR.
Blonda O. Strother.
BY
Harness, Dickey & Pierce.
ATTORNEYS.

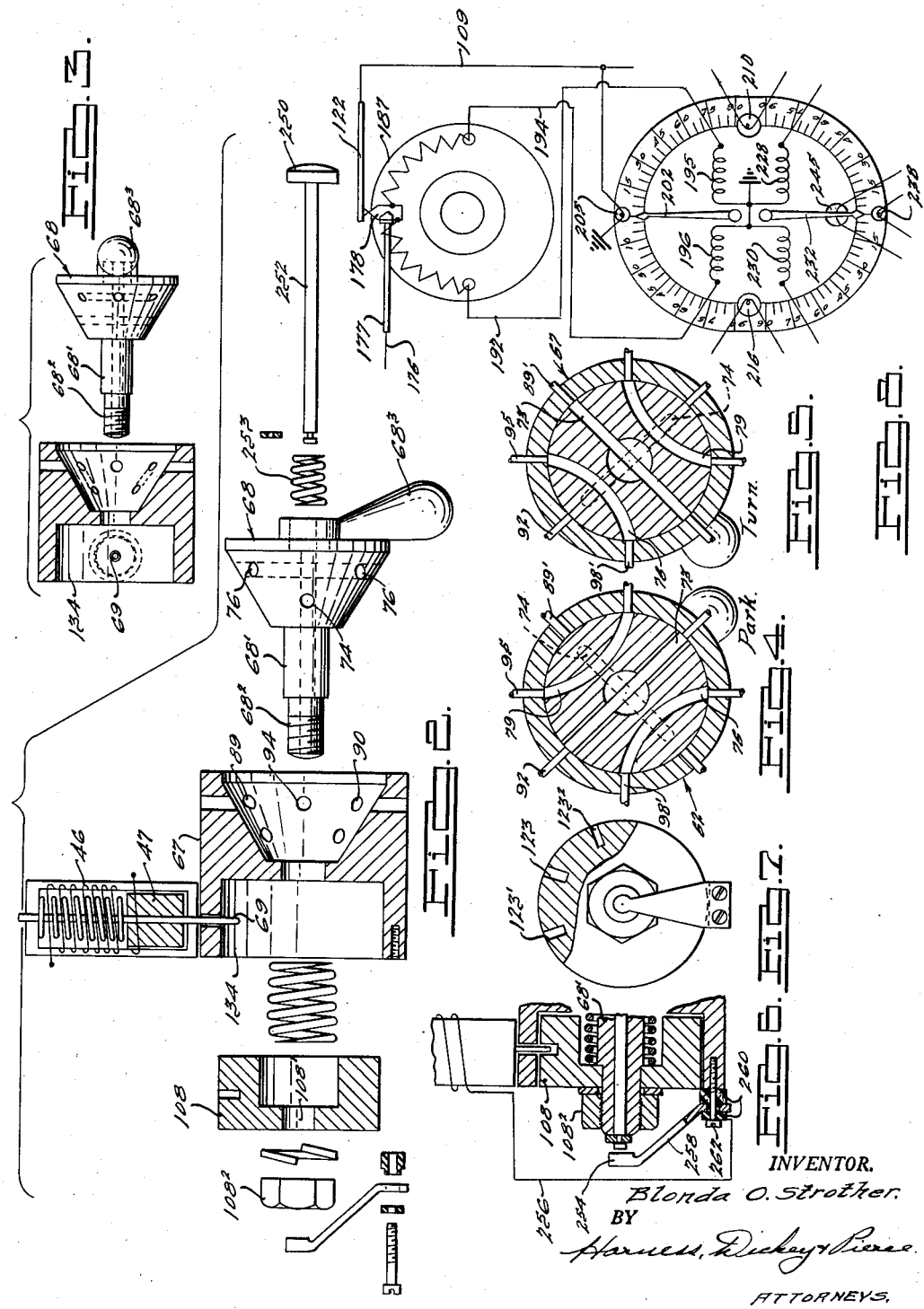

Patented June 27, 1950

2,512,979

UNITED STATES PATENT OFFICE 2,512,979

STEERING SYSTEM

Blonda O. Strother, Detroit, Mich.

Application July 31, 1947, Serial No. 764,939

10 Claims. (Cl. 180—79.2)

This invention relates to hydraulic power drive systems. Although the invention is particularly applicable to systems for the operation of steerable elements, such as the wheels and rudders of land, sea and aircraft, and my preferred embodiment as herein disclosed comprises a system for steering the wheels of a motor vehicle, it will be recognized that the principles of the invention may readily be applied to other uses. An object of the invention is accordingly to provide an improved system adapted to impart to one or more movable elements, and to control the direction and extent of, angular, lateral or swinging movements which are accurately and quickly regulable under the direction of a single, manually operable controlling agency which may take the form of a steering wheel or the like.

It will be appreciated from the foregoing that in the following description, references to parts of a motor vehicle, and to other known elements with which my invention is adapted to coact, are intended in an explanatory sense and by way of example rather than as restrictive.

Another important object of the invention is to provide an improved system of the character indicated which is very flexible in character and which permits an operator or driver to control a plurality of steerable wheels or the like in such manner that steering movements may selectively be applied to some wheels but not others, as the operator may desire; or alternatively, different wheels may be made to swing either in the same direction or in different directions, again at the election of the operator.

By way of illustration, my improved system is herein disclosed in connection with a type of automobile so designed that all four wheels are steerable through an arc of 180°. This is made possible by the provision of an individual propelling motor (not shown) carried by each wheel of the vehicle, and by the provision of an independently sprung suspending structure for each wheel. The details of the automobile construction including the wheel suspension and the motor means above mentioned, form no part of my present invention and are known in the art. They are accordingly not illustrated herein.

I take advantage of the extreme steering movement of the wheels made possible by the aforementioned motorcar construction by providing steerable mountings for all four of the wheels, and incorporate in my preferred embodiment:

(a) Means for steering the front wheels only, while the rear wheels remain parallel to the center line of the vehicle (for ordinary steering while the vehicle is being driven under ordinary conditions).

(b) Means for simultaneously steering the front wheels in one angular direction and the rear wheels in the opposite angular direction (to permit turning of the vehicle in a very short length), and (c) Means for simultaneously turning the front and rear wheels in the same angular direction (so that the vehicle may be moved sideways or perpendicularly to its longitudinal center line to facilitate parking and to permit lateral movement of the vehicle whenever desired, as when maneuvering in close quarters).

The primary objects of the invention may be summarized as comprising the provision of means for attaining the above-indicated ends and constituting a structure of compact, simple, inexpensive, rugged, and reliable character.

Still another object is to provide a steering system of the indicated character permitting steering movements of the wheels in the conventional manner by means of a steering wheel, and incorporating a manual selector operable in a very simple manner, as by means of a single handle, whereby the action of the system may be varied to permit the imparting of different steering movements to the steerable wheels in response to turning of the same steering wheel. Thus, the same handwheel may effectuate steering movements of the front and rear wheels of the vehicle either independently or simultaneously in the manner above indicated.

Another object is to provide in a system of the indicated character novel interlocking means preventing changing of the steering relationship between the wheels except when the wheels are in predetermined positions (preferably parallel to the longitudinal center line of the vehicle).

Still another object is to provide improved signal means adapted to inform the driver as to the condition of the steering system when it is so adjusted as to impart steering movements to the wheels in other than a conventional manner.

Another object of the invention is to provide such a steering system having a self-energizing or servo action and accordingly requiring very little manual effort on the part of the driver.

Other objects and advantages will be apparent upon consideration of the present disclosure in its entirety.

In the drawings:

Fig. 1 is a diagrammatic plan view of a vehicular steering system incorporating the principles of the present invention;

Fig. 2 is an exploded view of the selector valve, showing the valve plug in elevation and the valve casing in horizontal diametric section and substantially as indicated by the line and arrows 2—2 of Fig. 1;

Fig. 3 is an exploded view similar to Fig. 2 but showing the valve plug and casing only and taken at right angles to Fig. 2 and substantially as indicated by the line and arrows 3—3 of Fig. 1;

Figs. 4 and 5 are fragmentary sectional views of the selector valve in different operative positions;

Fig. 6 is a fragmentary diametric sectional view of the valve latching means;

Fig. 7 is a rear elevational view of a part of the latching means, partly broken away; and Fig. 8 is a partly diagrammatic elevational view of a part of the indicating system, on a larger scale.

Referring now to the drawings, and particularly to Fig. 1, reference character 10 designates the chassis frame of a vehicle to which my improved steering system is illustratively depicted as applied. The frame 10 is fragmentarily indicated in dotted lines only, since its details form no part of my present invention, although it is preferably of the centrally disposed tubular or so-called "backbone" type.

The vehicle is provided with front wheels 1R, 1L and rear wheels designated 2R, 2L, suspended from and supporting the frame through the agency of any appropriate suspension means (not illustrated), each wheel being carried by a stub axle as 12 swingable for steering about a kingpin as 14, the steering movement being sufficient to permit the stub axle and the wheel mounted thereon to swing 90° in either direction from the normal position corresponding to straight-ahead positioning of the wheel.

An individual hydraulic motor mechanism is provided for imparting steering movements to each wheel. Since all of these steering motor mechanisms may be alike, description of one will suffice. Each such steering motor mechanism consists of a single radial vane as 15R lying in a vertical plane and rigidly secured to and swingable with the stub axle 12 about the axis of the kingpin. The vane fits accurately within the semicylindrical housing as 16R. Steering is effected by selectively applying fluid pressure to the interiors of the steering motor housings of the several wheels upon one side or the other of the respective vanes of such motors, to swing the wheels as desired.

A suitable supply of oil or other substantially incompressible fluid is maintained in a reservoir 20 from which it is pumped as by the gear pump schematically indicated at 22. The pump is preferably constantly driven by the engine of the vehicle and draws fluid from the reservoir through conduit 21, delivering the fluid by way of conduits 23 and 24 to a steering valve, the casing of which is generally designated 25. The valve member 27 within the casing 25 is of the piston type, having a central spool portion 28 and left-end and right-end spool portions 31 and 32 respectively connected to the central spool 28 by the reduced stem portions 33—34. The valve piston assembly thus constituted is yieldably centered in the casing 25 by means of springs 36—37, one such spring being arranged at each end of the piston assembly, as shown. The fluid entering the central portion of the valve casing through an opening 35 to which the conduit 24 is connected passes into a groove 40 formed in the adjacent face of the spool 28. When the valve assembly is centered, as shown in Fig. 1, the fluid may escape from groove 40 through a diametrically formed bore 41 extending through the spool 28 and connecting the groove 40 therein to the opposite face of the spool, at which opposite face the bore 41 registers with an escape port 42. When the piston assembly is centered, the fluid may return from port 42 to the reservoir 20 by way of conduits 44 and 45.

Groove 40 is long enough to bridge the space, and provide communication, between the central port 35 and either one of the two spaced ports 51—52. Both of the last-mentioned ports 51 and 52 are blanked off by the end portions of the spool 28 when the piston assembly is centered. The valve is also constructed so that when in the centered position all passages leading into and from the valve are isolated from one another excepting the inlet and return ports 35—42. When the valve is moved to connect ports 35—51, it also connects conduits 62—93 and 77—104 via the reduced portions 34 and 33 respectively. Similarly, when the valve is moved to the right to connect ports 35—52, it establishes connection between conduits 78—93 and between conduits 61—77.

The ports 51 and 52 are connected to the opposite sides of a steering pump assembly generally designated 50 and which is preferably of a suitable, reversible, positive displacement type, such as a gear pump. One of the gears as 53 may be positively driven by the shaft 55 which is connected to and adapted to be turned by the steering wheel (not shown). Connection between port 51 and one side of the pump is effected by a conduit 61, while port 52 is connected to the other side of the pump by a corresponding conduit 62. Conduit 61 is also connected to the left end of the valve casing 25 by a branch conduit 63, and conduit 62 is similarly connected to the right end of the valve casing by a branch conduit 64. It will, therefore, be seen that whenever a pressure difference exists between the conduits 61 and 62, the valve is moved away from the conduit containing the higher pressure.

If the steering wheel is turned in a direction to increase the pressure in conduits 62, 64, as by turning the steering wheel to the right or clockwise, the steering valve 27 will be moved to the left, as the parts are viewed in the drawing. The escape port 41 is thereby closed and communication is established between ports 35, 51 so that pressure fluid from the pump 22 now passes through the conduit 61 to the left side of the steering pump 50. Such fluid assists in the turning of the steering wheel, and the pressure from the output side of the steering pump 50 is delivered through conduit 62 and valve chamber 34 to a conduit 93 leading to one of the ports as 95 of a selector valve 67. The selector valve will be described in greater detail hereinafter, and serves the function of enabling the pressure fluid to be delivered to the individual steering motors in such fashion as to provide any of three different steering functions at the will of the operator.

With the selector valve in the position in which it is shown in Fig. 1, which is the normal driving position in which only the angular positions of the front wheels are influenced by movement of the steering wheel, the fluid passes from port 95 through the valve passage 73 and by way of a conduit 99 and branch conduit 101 to the front wheel steering motor casings 16R, 16L. It will be seen that the conduits 99 and 101 are so connected to the steering motor casings that delivery of pressure in this manner tends to swing both wheels to the right. During such steering movements, the fluid upon the opposite sides of the steering motor vanes 15R, 15L, is returned to the reservoir 20 through conduits 102, 103, 104, and by way of valve chamber 33 and branch conduit 77 to the return line 45, leading to the reservoir.

If movement of the steering wheel is arrested to hold the front wheels at a desired angular position, the pressure in conduits 62, 64 drops and the springs 36, 37 return the steering valve to centered position. The fluid lines 93, 104 to the steering motors are thus isolated as shown in Fig. 1, trapping the fluid in such motors and thereby locking the vanes and the wheels in the desired positions until the steering wheel is again turned.

If the steering wheel is now turned to the left, a similar operation to that described for right-hand turning will occur in the reverse direction. Pressure builds up in fluid conduits 61, 63 moving the steering valve piston 27 to the right and again closing the escape port portions 41, 42. Port 35 is thereby placed in communication with conduit 62 by way of valve chamber 40 and the fluid thereby delivered to pump 50 provides a servo action assisting in the turning of the steering wheel to the left. After passing through the steering pump 50, the fluid is delivered by way of conduit 61 and valve chamber 33 to conduits 104, 103, 102, and thus to the front wheel steering motors 16R, 16L, entering these upon the opposite sides of the vanes 15R, 15L, and so turning both front wheels to the left as will be apparent. The fluid returned from the front steering motors during their leftward steering movement passes through conduit portions 101, 99 and through the selector valve passage 73 and conduit 93 to the steering valve body. The fluid then passes through the valve passage 34 to the branch return conduit 78 from which it is returned to the reservoir by way of conduit 45 as before.

It will be observed that at all times when the power pump 22 is in operation, fluid under pressure is delivered by way of conduit 23 to a port 89' of the selector valve assembly 67, which has a rotatable tapered plug-type valve element 68. With the valve element 68 in the middle or "drive" position in which it is shown in full lines in Fig. 1 (in which position only the front wheels are steerable), the pressure fluid is conducted from port 89' through a valve passage 79 to a conduit 90 which enters one end of a locking cylinder 135. A piston 136 within the locking cylinder is thereby urged outwardly. A stem 137 attached to the piston projects from the cylinder and is at such time engaged in a notch 140 in the hub portion 141. An arm 126 fast at its inner extremity to the hub 141 is pivotally connected at its outer end to a tie rod 128 which connects the two rear wheels in such manner as to assure their movement in unison during steering. Stem 137 is only engageable in notch 140 when the rear wheels 2R, 2L are in the straight-ahead position, and when so engaged these wheels are locked against steering movement. The ends of the tie rods 128 are connected to the individual wheels by means of arms as 124 rigidly connected to and adapted to swing with the steering motor vanes and stub axles of the respective wheels.

The system incorporates means for preventing turning of the selector valve 68 away from the normal centered position in which it is shown in Fig. 1 except when the front wheels are in their straight ahead positioning. Such means consists of an electromagnetic lock, in the preferred embodiment shown. A hub 108 is keyed to a squared portion 68' of the stem of the valve plug, to turn as a unit with the latter, the hub being provided with a squared axial aperture 108' engageable with the squared section of the valve stem, and held upon the threaded end $68^2$ of the stem by a nut $108^2$. Hub portion 108 turns in a cylindrical chamber 134 formed in the rear end of the valve casing 67. A series of radial openings 123, 123', $123^2$ is formed in the periphery of the hub 108, and a locking plunger 69, when engaged in the opening 123, holds the valve in the centered "Drive" position and against turning. The plunger 69 is retractable, to permit the valve to be manually adjusted, under the influence of a solenoid 46 acting upon an armature 47 to which the plunger 69 is attached. One terminal of the solenoid is groundable by means of a push button 250 attached to and movable with a rod 252 extending axially through and longitudinally slidable in the valve plug 68 and its stem portions 68', $68^2$. The rod 252 and connected parts of the valve structure are formed of conductive material and grounded, and the rear end of the rod is projectable from the rear end of the valve stem to engage an insulated contact 254 to which the groundable terminal of the solenoid is connected as by the conductor 256. Insulated contact 254 is formed with an integral arm 258 serving in cooperation with insulating washers 260 and screw 262 to mount the contact upon while insulating it from the rear end of the valve casing 67. The other terminal of the solenoid is connected by means of a conductor 109 to a wiping contact 122 engageable with a live contact 178 carried by and rotatable with the hub portion 187 which is formed of insulating material and carried by and adapted to turn with an arm 185 articulated to the front wheel tie rod assembly 127 and so rotatable with and conformable to the steering movement of the front wheels. The contact 178 is in effect the center tap of a potentiometer winding 190 also carried by and rotatable with insulated hub portion 187. The wiping contact 177 of the potentiometer is also engageable with tap 178 when the wheels are straight ahead, and contact 177 is continuously electrically connected to a source of current such as the storage battery 175 of the vehicle whenever the ignition switch 180 is closed. The contacts 122, 178 are separated to break the circuit to the solenoid whenever the front wheels are turned away from the straight ahead positioning. When these contacts are closed, however, a circuit is completed from the battery to the solenoid 46, as will be apparent, but the return circuit from the solenoid to ground required to retract the plunger 69 and permit the selector valve plug 68 to be turned is only completed by actuating push button 250 while the wheels are straight ahead and contacts 122, 178 are engaged. It is then possible to turn valve 68 by means of its handle $68^3$, with which the push button is associated, as shown in Fig. 2. The push button contacts are normally yieldably separated by a spring 253 housed in the valve plug and in its handle portion.

If when the front wheels are in the straight-ahead position and the valve 68 is free to turn by reason of the retraction of the plunger 69 in the manner described, the valve is turned counterclockwise to the position designated "Park" and shown in Fig. 4; the hydraulic circuit is so changed that the rear wheels are caused to swing with and in the same direction as the front wheels, always remaining parallel thereto. Since all of the wheels may in this fashion be turned to positions 90° with respect to the longitudinal centerline of the car, it will be seen that the vehicle may be moved sidewise into and out of a parking space, or moved bodily laterally at any desired angle with respect to the centerline, to permit maneuvering in close quarters. With the valve in this position, fluid is conducted from the steering valve body 25, during a right turn, through the conduit 93 and valve passage 79 and conduits 94, 97 to the rear wheel steering motor casings 116R and 116L, entering these casings upon such sides of the vanes therein as to swing the wheels to the right, as will be apparent. The fluid discharged from the rear wheel steering motors passes through conduit portions 96, 98 to selector valve port 98', passes through valve passage 76 and then through conduits 99, 101 to the front wheel steering motors, so that the front wheels are simultaneously turned to the right, the fluid from the front wheel motors being returned to the reservoir in the manner previously described. Upon a left turn, with the selector valve in the park position, a reverse fluid flow occurs to turn all of the wheels to the left, the fluid from the steering valve passing first through the front wheel steering motors by way of fluid conduits 104, 103, 102, and the discharge from the front steering motors being conducted to the rear steering motors by way of conduits 101, 99, selector valve passage 76 and conduits 93, 96. The fluid discharged from the rear wheel steering motors at the same time is returned to the reservoir through conduit 94, selector valve passage 79, conduit portion 93, steering valve chamber 34 and return lines 78, 45.

With the selector valve turned clockwise from the centered position, to the position designated "Turn," and shown in Fig. 5, the fluid circuit is so modified that upon turning of the steering wheel, the front and rear steerable wheels are swung simultaneously and at corresponding angular rates, but in opposite directions. It will be seen that this permits turning the vehicle upon a very short radius, and even within its own length if desired. With the selector valve in the "Turn" position, the operation of the steering wheel is again the same, but when the steering wheel is turned clockwise as for a right turn, the fluid flows from the steering valve casing by way of conduit 93, valve passage 76 and fluid conduits 98, 96 to the rear wheel steering motors 116R, 116L, entering the casings of these steering motors at such ends thereof as to swing the rear wheels to the left, as will be apparent. The fluid discharge from the rear wheel steering motors passes through conduits 94, 95, selector valve passage 79 and conduits 99, 101 to the front wheel steering motors 16R, 16L, entering these motors in a direction to turn the front wheels to the right, or in the opposite angular direction from the rear wheels. Upon a left turn of the steering wheel under these conditions, a reverse flow occurs from the steering valve to the front wheel motors by way of conduits 104, 103, 102, the discharge from the front steering motors being conducted to the correspondingly opposite extremities of the rear wheel steering motor casings through conduits 100, 101, 99, selector valve passage 79 and conduits 94, 95, the discharge from the rear steering motors being returned to the reservoir as before.

Releasable locking means is also provided for preventing turning of the selector valve 68 out of the "Park" and "Turn" positions except when the front wheels are straight ahead, and such locking means may comprise additional sockets 123', 123², functioning similar to socket 123 and engageable by the plunger 69 when the valve is in the "Park" and "Turn" positions respectively and the solenoid is not energized.

An indicating system is preferably provided and arranged on the instrument panel or in some other suitable position within the view of the driver and so arranged as to provide for the driver both a quick indication showing by means of colored lights whether or not the front wheels are in the straight-ahead positioning which is necessary to unlock the selector valve, and an exact representation as to the angular position occupied by the wheels at all times. The system also preferably indicates whether or not the rear wheels are locked in the straight-ahead positioning which is desirable at all times under ordinary driving conditions, and further provides a vivid indication by means of colored lights when the wheels have been swung to the limits of their steering movement and are accordingly at right angles to the car.

From a suitable source of current which may comprise the storage battery 175 of the vehicle, the conductor 176 leads to the potentiometer contact 177 previously mentioned which cooperates with the contacts 122, 178 previously described. The contact 177 is also in wiping engagement with the potentiometer winding 190 as noted above. Opposite extremities of the potentiometer winding 190 are connected by means of conductors 192, 194 to oppositely acting coils 195, 196 of a dual milliammeter assembly or other suitable electrical measuring device which is preferably of relatively high resistance for the sake of current economy. This meter is generally designated 200, and may be mounted upon the instrument panel of the vehicle, in the center of the steering wheel, or in any other convenient location. The other terminals of coils 195, 196 may be grounded as indicated at 198. Coils 195, 196 react upon an indicating needle 202 which stands in a centered position when both coils are de-energized or are energized equally. In this connection it will be appreciated that if desired the two legs of the winding 190 might be insulated from contact 178 at their inner ends so that with the wheels in the straight-ahead positioning no current would be drawn by the potentiometer or the windings. This is a matter of choice, however, and it will be apparent that the current drain of such a system may be very slight in any event.

Assuming the coil 190 to be in effect continuous, as shown, it will be appreciated that when the wheels are turned for right steering, the left-hand leg of the potentiometer winding as viewed in Figs. 1 and 8 will in effect be shortened, increasing the current to the coil 195 and decreasing that to the coil 196 so that the needle 202 will be deflected clockwise. The angular motion imparted to the needle and the calibrations of the dial of the meter may be made to correspond to degrees of turning movement of the steerable front wheels, and it will be appreciated that a corresponding reverse movement of the needle occurs upon steering to the left, so that the needle 202 may all times afford an exact indication of the positioning of the front wheels.

A branch conductor 204 connected to the conductor 109 leads to a pilot light 205 which may be colored green and the other terminal of which is grounded so that it will be illuminated concurrently with energization of the solenoid 46 to indicate that the front wheels are in their straight-ahead positioning and that the selector valve is actuatable. When the front wheels are turned about their steering axes to the extreme right-hand position, steering motor vane 15L grounds a contact 206 and so completes a circuit through conductor 208 from such contact to a pilot light 210, which may be colored red and so positioned that when illuminated it affords an effective indication that the extreme of right-hand steering movement has been reached. The other terminal of pilot light 210 is connected by means of a conductor 212 to the power lead 176. At the limit of full left steering movement of the front wheels, steering motor vane 15R engages a contact 214 housed in appropriate position within steering motor casing 16R, a circuit being thereby completed by way of conductor 215 to a pilot light 216 which may be colored red and positioned upon the instrument panel in appropriate location to indicate that the extreme of left-hand steering movement of the front wheels has been reached. The other terminal of pilot light 216 is connected by a conductor 218 to the main power lead 176.

Power lead 176 is also extended rearwardly, as indicated at 176', for connection to a potentiometer wiping contact 220 engageable with a potentiometer winding 222 carried by a rear insulated hub portion 141 and corresponding in arrangement and functioning to the front potentiometer winding 190 so that the current passing through the two legs of the potentiometer winding is a direct function of their relative length and so of the angular positioning of the rear steerable wheels. The opposite ends of the potentiometer winding are similarly connected by means of conductors 224, 226 to the actuating coils 228, 230 of the dual meter construction positioned upon the instrument panel. The inner extremities of the coils 228, 230 may be similarly grounded at 198 and the proportionate energization of these coils determines the angular positioning of the indicating needle 232 for the rear wheels. It will be apparent that when the rear wheels are turned to the right the increased current in the leg of the potentiometer winding connected to conductor 224 and to coil 228 moves the needle 232 in the corresponding direction, while a reverse actuation and a reverse deflection of the needle occur upon steering of the rear wheels to the left.

I also preferably provide visual indication as to the condition of the rear wheel locking means controlled by the hydraulic cylinder 135, the action of which is described above. When the locking plunger 137 is engaged in the socket 140 to lock the rear wheels in their straight-ahead positioning, it completes a grounding connection to a contact 235 connected by means of a conductor 236 to a pilot light 238 which may be colored green and appropriately positioned upon the instrument panel to indicate that the rear wheels are locked. The other terminal of the pilot light 238 is connected by a conductor 240 and conductor 212 to the main power lead 176. When the locking plunger 137 is retracted, it completes a grounding connection to a contact 242 connected by means of a conductor 244 to a pilot light 245 which may be colored red and appropriately positioned upon the instrument panel to indicate when illuminated that the rear wheels are unlocked. The other terminal of the pilot light 245 is connected by means of a conductor 246 and conductor 212 to main power lead 176. This arrangement will be seen to cause illumination of the red lamp 245 whenever the rear wheels are unlocked, and the driver is thus warned that the system is not in condition for normal driving.

It will be apparent that various modifications may be introduced without departing from the proper scope and fair meaning of the subjoined claims.

I claim:

1. A steering system for a vehicle having front and rear steerable wheels, said system being adapted to be connected to a source of fluid under pressure, front and rear steering motors adapted to impart steering movements to the front and rear wheels respectively of such a vehicle, flow reversing means interposed between said source and the steering system and responsive to turning movement of a steering wheel or the like for operating said motors in either direction and thereby imparting simultaneous steering movements to the front and rear wheels, means for locking the rear steerable wheels against steering movement without interfering with steering movement of the front wheels, said locking means including a personally operable valve-type control member movable to and from a rear-wheel-locking position, means normally holding said control member against movement away from rear-wheel-locking position, and means responsive to positioning of the front wheels in straight-ahead relation for releasing said holding means to permit operation of said control member.

2. A steering system for a vehicle having front and rear steerable wheels, said system being adapted to be connected to a source of fluid under pressure, front and rear steering motors adapted to impart steering movements to the front and rear wheels respectively of such a vehicle, flow reversing means interposed between said source and the steering system and responsive to turning movement of a steering wheel or the like for operating said motors in either direction and thereby imparting simultaneous steering movements to the front and rear wheels, means for locking the rear steerable wheels against steering movement without interfering with steering movement of the front wheels, said locking means including a personally operable valve-type control member movable to and from a rear-wheel-locking position, said valve-type control member including cut-off valve portions for selectively preventing steering movement of the rear steerable wheels when said member is in rear-wheel-locking position and also including reversing valve portions to enable imparting steering movements to the rear steerable wheels in directions opposite to, but simultaneous with, steering movements imparted to the front steerable wheels, and locking means controllable by the front wheels for preventing turning of said control member away from rear-wheel-locking position.

3. Power drive means for a plurality of hydraulic motors, comprising in combination with a source of hydraulic fluid pressure, means for conducting fluid under pressure to and from each of said motors, a unitary valving mechanism interposed between at least one of said motors and said source for changing the direction of fluid flow to one of said motors to reverse the relative direction of drive thereof, and means including a mechanical lock and an actuating element therefor responsive to the position of another of said motors for locking said valving means against actuation.

4. Means as set forth in claim 3 in which said valving mechanism incorporates means for interrupting the fluid flow to said reversible motor to prevent actuation thereof.

5. Power actuating means for a steering system or the like incorporating in combination with a source of hydraulic fluid under pressure, a plurality of steerable elements, separate hydraulic driving motors for different ones of said steerable elements, said motors being reversible, means including a selector valve for selectively connecting said motors to said source whereby the motors and the steerable elements may be driven in the same or different directions, means for cutting off the fluid supply to one of the motors, and means including a latch element and a hydraulic actuator therefor for locking an element which is steerable by said last-mentioned motor when the fluid supply to said motor is cut off.

6. Means as set forth in claim 5 in which said means for cutting off the fluid supply is actuatable by and concurrently with said valve, and said hydraulic actuator is also connected to and actuatable by the valve and in response to movement of the valve to said cutting-off position.

7. Power steering means for a vehicle having front and rear steerable wheels, comprising in combination with a source of hydraulic fluid under pressure, separate reversible hydraulic motor means for imparting steering movements to the front wheels and to the rear wheels, a fluid conveying system for conducting fluid derived from said source to and from said motor means, means for reversing the fluid flow in said system to change the direction of steering movements imparted to and by all of the motor means, a unitary selector valve mechanism also incorporated in said system and including cutoff and reversing portions connected to the motor means for the rear wheels only, whereby steering movements of the rear wheels may be prevented without interfering with those of the front wheels, and whereby the relative direction of steering movements imparted to the rear wheels may be reversed with respect to the front wheels, a retractable locking element for mechanically locking the rear wheels against steering movement, and means including a supplemental locking motor device for actuating said locking element in response to positioning of said selector valve mechanism in such position as to cut off fluid flow to the rear wheel motor means.

8. Power steering means for a vehicle having front and rear steerable wheels, comprising in combination with a source of hydraulic fluid under pressure, separate reversible hydraulic motor means for imparting steering movements to the front wheels and to the rear wheels, a fluid conveying system for conducting fluid derived from said source to and from said motor means, means for reversing the fluid flow in said system to change the direction of steering movements imparted to and by all of the motor means, a unitary selector valve mechanism also incorporated in said system and including cutoff and reversing portions connected to the motor means for the rear wheels only, whereby steering movements of the rear wheels may be prevented without interfering with those of the front wheels, and whereby the relative direction of steering movements imparted to the rear wheels may be reversed with respect to the front wheels, means responsive to movement of the front wheels out of a predetermined position for restraining operative movement of said selector valve.

9. Power drive means for a plurality of hydraulic motors, comprising in combination with a source of hydraulic fluid pressure, means for conducting fluid under pressure to and from each of said motors, valving means interposed between at least one of said motors and said source for changing the direction of fluid flow to one of said motors independently of the others to reverse the relative direction of drive thereof, means normally locking said valving means against actuation, including a latching member, actuating means for the latching member, disabling means for preventing operation of said latch actuating means, and steerable members actuatable by said motors, said disabling means being actuatable in response to movement of at least one of said steerable members away from a predetermined position.

10. In a remotely controllable power-actuated steering system for vehicles and the like, in combination with a steerable element and motor means for imparting steering movement thereto, and with control means located at a control station remote from the motor means and from the steerable element for controlling the action of such motor means and steerable element, indicating means located at such control station including a meter having a member movable conformably to steering movements of the steerable element, and means located appurtenant the steerable element and arranged in an electrical circuit with said meter, said means appurtenant the steerable element including a member movable to change a parameter of said circuit which includes said meter, to actuate the meter in response to steering movements of the steerable element.

BLONDA O. STROTHER.

REFERENCES CITED

The following references are of record in the file of this patent:

UNITED STATES PATENTS

| Number | Name | Date |
|---|---|---|
| 867,282 | Macfarren | Oct. 1, 1907 |
| 1,928,915 | Stout | Oct. 3, 1933 |
| 2,054,296 | Merrill | Sept. 15, 1936 |
| 2,178,073 | Hardy | Oct. 31, 1939 |
| 2,184,793 | Clench | Dec. 26, 1939 |
| 2,206,163 | Clench | July 2, 1940 |
| 2,248,251 | Reeves | July 8, 1941 |
| 2,336,715 | Casler | Dec. 14, 1943 |